Patented Apr. 1, 1924.

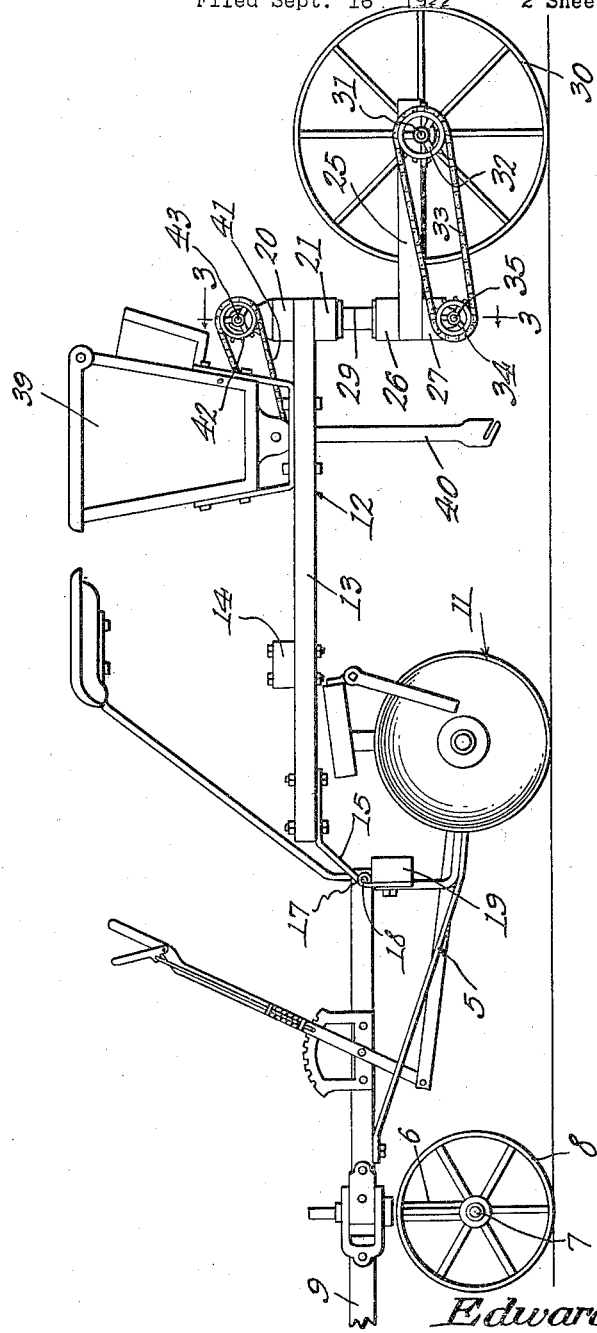

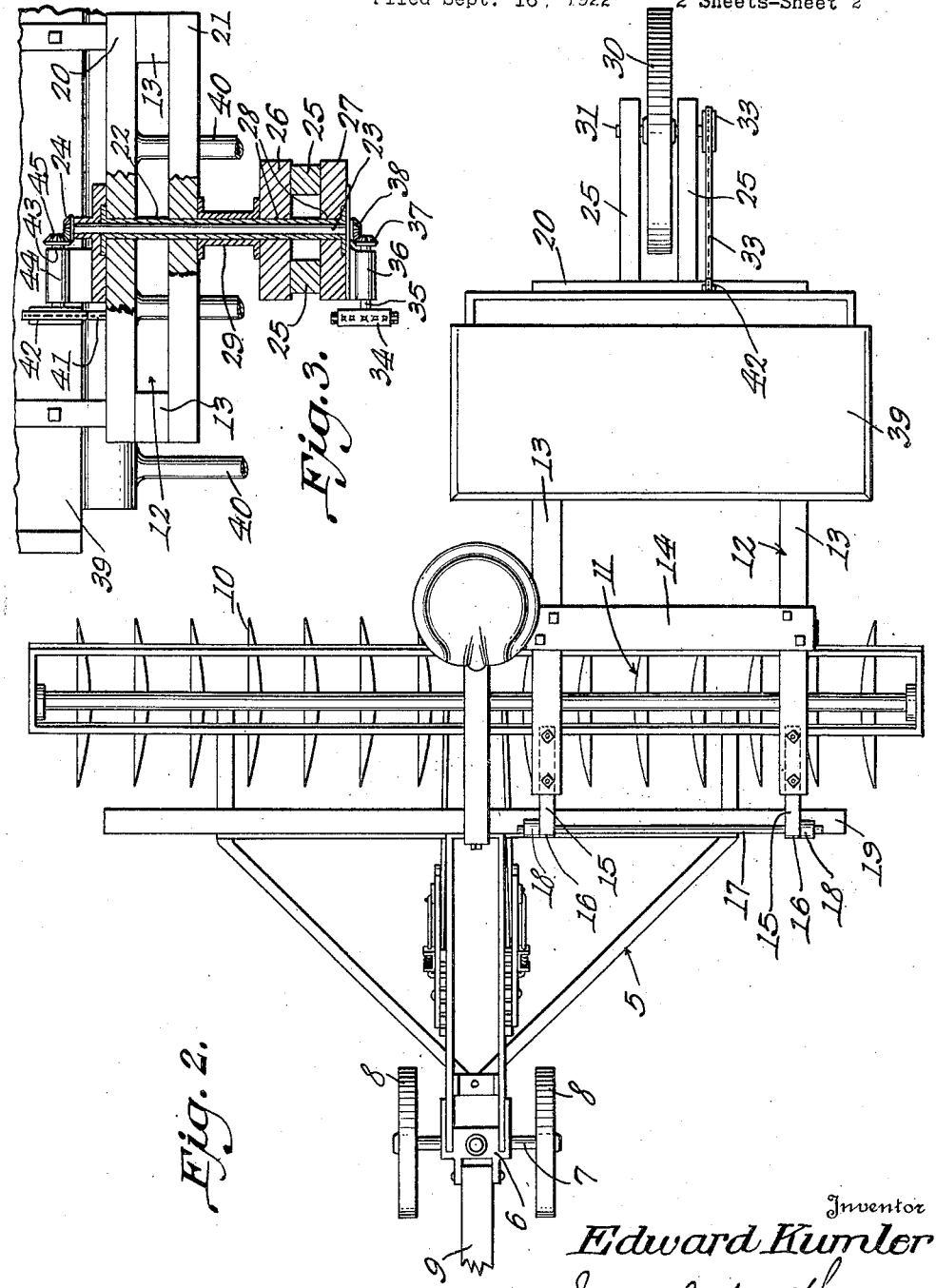

1,489,133

UNITED STATES PATENT OFFICE.

EDWARD KUMLER, OF KEWANNA, INDIANA.

PLANTER.

Application filed September 16, 1922. Serial No. 588,696.

*To all whom it may concern:*

Be it known that EDWARD KUMLER, a citizen of the United States, residing at Kewanna, in the county of Fulton and State of Indiana, has invented certain new and useful Improvements in Planters, of which the following is a specification.

My invention relates to a machine for planting small grain, such as oats or the like. An important object of the invention is to provide a machine which will properly work or plow the soil and plant the grain, while properly covering the grain, in a manner to save time and labor.

Other objects and advantages of the invention will be apparent during the course of the following description.

In some parts of the United States, such as in the State of Indiana, in the planting of oats or like small grain, the plowing of the field has been dispensed with. The field is first worked with a harrow disk, which serves to cut or break up the soil. A harrow disk ordinarily embodies a pair of gangs of disks, and these disks cut deeper into the soil, depending upon the angularity of the gangs. In going over the field the first time, the gangs of disks ordinarily cut the soil and throw it in opposite directions, producing a central depression. It is customary to go over the field in the same direction, a second time, in a manner to lap the previously worked portions of the field. This lapping causes one gang of disks to work the field previously worked by the opposite gang of disks, and in this manner the soil is thrown back in opposite directions, and the field is thoroughly worked and leveled. With the field thus worked, it has been customary to use a seed drill for planting oats and the like, which properly deposits the seed to the worked soil and covers the same.

I have discovered that this method of planting oats or the like may be greatly simplified and the time reduced in the planting, by the use of a method and apparatus which I have invented.

In accordance with my invention, I employ a disk harrow having a pair of gangs of disks. Arranged rearwardly of one gang, namely the left hand gang, I provide a seed box having depending chutes for depositing the grain. The seed box extends throughout one-half the length of the combined lengths of the two gangs of disks, and hence is adapted to seed one half of the area which is worked or harrowed by the harrow disk. In this manner, as the machine is driven forwardly over the field, the strip of soil is harrowed or worked, and one-half of the width of such strip is planted with the oats. When the machine makes the second trip around the field in the same direction, one gang of the disk harrow works or harrows the planted harrowed strip while the other gang harrows or works the next strip, which is simultaneously planted. By this means a strip having the width of one gang of disks is worked twice and planted between the workings. This is advantageous, as the seeds are covered as soon as the harrowing or working is completed, and there is no liability of the seed being blown about, or injured by rain when uncovered.

In the accompanying drawings forming a part of this specification and in which like numerals are employed to designate like parts throughout the same, Figure 1 is a side elevation of a machine embodying my invention, Figure 2 is a plan view of the same, and, Figure 3 is a detail section taken on line 3—3 of Figure 1.

In the drawings, wherein for the purpose of illustration is shown a preferred embodiment of my invention, the numeral 5 designates the frame of a disk harrow, which may be of any well known or preferred construction. The forward end of this frame is pivotally mounted upon a carriage 6, having an axle 7, carrying wheels 8. A tongue 9 is secured to the carriage 6, and is employed in drawing the disk harrow and in turning the carriage 6, in steering. The draught animals are secured to the tongue 9.

The numerals 10 and 11 designate a pair of gangs of harrow disks, which are faced and pitched outwardly in opposite directions, as is well known. Any suitable means may be employed to adjust the angle of the gangs with respect to the longitudinal axis of the machine, and to raise and lower the same with relation to the machine.

The numeral 12 designates a supplemental frame, embodying beams 13, connected by a transverse beam 14. The beams 13 have connection at their forward ends with strap irons 15, provided at their ends with knuckles 16, pivotally receiving a rod 17 held in knuckles 18, secured to a beam 19 of the frame 5. The beams 13 extend rearwardly and have transverse upper and lower beams 20 and 21 connected therewith. As more clearly shown in Figure 3, a sleeve 22 extends through these transverse beams 20 and 21 and is rigidly held therein. This sleeve pivotally receives a vertical shaft 23, provided at its top with a beveled gear 24, as shown.

The numeral 25 designates a pair of beams, having their forward ends rigidly secured to blocks 26 and 27, which have vertical openings 28, to pivotally receive the sleeve 22. A spacing sleeve 29 is arranged above the block 26. It is thus seen that the beams 25 are pivotally connected with, or mounted upon the sleeve 22, to turn horizontally thereon.

The numeral 30 designates a traction wheel, rigidly mounted upon an axle 31, pivotally connected with the rear ends of the beams 25. This axle drives a sprocket wheel 32, engaged by a sprocket chain 33, extending forwardly to engage a sprocket wheel 34. This sprocket wheel 34 is rigidly mounted upon a counter shaft 35, journaled in a bearing 36, fixed to the lower block 27. The counter shaft 35 is provided at its inner end with a beveled gear 37 engaging the beveled gear 38, which is rigidly mounted upon the lower end of the shaft 23, as shown. The wheel 30 serves to support the rear end of the seeder frame 12 and the wheel is pivoted so that it will properly turn when the machine is turning at the end of the row.

The numeral 39 designates a seed box or hopper, arranged directly behind the gang of harrow disks 11, and extending for substantially the entire length of the gang, or for one half of the length of the combined lengths of both gangs. Depending from the hoppers 39 are chutes 40, which deposit oats or the like upon the worked or harrowed strip, at the rear of the gang 11. The usual agitating or feed means found in the hopper of seed planting devices may be employed, and such means are driven by a sprocket chain 41, extending rearwardly to engage a sprocket wheel 42, fixed upon a shaft 43, journaled in a bearing 44. A beveled gear 45 is secured to the inner end of the shaft 43 and engages the beveled gear 24.

The operation of the machine is as follows:

The machine is drawn forwardly over the field and the gangs of harrow disks 10 and 11 work or harrow the ground, producing a harrowed strip having a width equal to the combined lengths of the two gangs. The seed box 39 and associated planting means deposits the oats or the like upon the strip of harrowed ground directly behind the gang 11, and over an area having a width equal to the length of the gang 11. When the machine is again driven over the same portion of the field, in a forwardly direction, the gang 10 will work or harrow the previously harrowed and planted section of the strip, thereby further working, leveling, and covering the planted seed, while the gang 11 will work the ground adjacent to the strip which is then harrowed for the second time, providing a new strip which is planted a little after being harrowed for the first time.

As a result of this method, it is only necessary to harrow the ground twice, and by planting the seed in the manner described, the seed is properly covered during the second harrowing. By thus lapping the harrowed sections, the work is completed upon one section while a new section is being harrowed or worked, without placing any considerable additional load upon the draught animals.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

A machine for working the soil, planting small grain or the like, and covering the planted grain, comprising a transverse pair of gangs of harrow disks, the disks in one gang being oppositely faced to the disks in the other gang, seeding mechanism for co-action with both pairs of gangs and arranged at the rear of one gang only and connected therewith to travel with the same, said seeding mechanism being substantially coextensive in length with the gang with which it is connected, and draught means connected with said gangs.

In testimony whereof I affix my signature.

EDWARD KUMLER.